(12) United States Patent
Tsurumoto

(10) Patent No.: US 8,577,040 B2
(45) Date of Patent: Nov. 5, 2013

(54) DATA TRANSMITTING METHOD AND APPARATUS, AND DATA COMMUNICATION METHOD AND APPARATUS

(75) Inventor: Takashi Tsurumoto, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/318,715

(22) PCT Filed: Apr. 23, 2010

(86) PCT No.: PCT/JP2010/057734
§ 371 (c)(1),
(2), (4) Date: Nov. 3, 2011

(87) PCT Pub. No.: WO2010/134424
PCT Pub. Date: Nov. 25, 2010

(65) Prior Publication Data
US 2012/0051546 A1 Mar. 1, 2012

(30) Foreign Application Priority Data
May 19, 2009 (JP) ................................ 2009-121314

(51) Int. Cl.
*H04K 1/00* (2006.01)
(52) U.S. Cl.
USPC ................................ 380/270; 380/28; 380/1
(58) Field of Classification Search
USPC ....................................................... 380/270
See application file for complete search history.

(56) References Cited

U.S. PATENT DOCUMENTS

| 5,600,720 A * | 2/1997 | Iwamura et al. ................... 380/1 |
| 6,108,326 A | 8/2000 | Bruwer |
| 2004/0136527 A1* | 7/2004 | Struik .............................. 380/28 |
| 2006/0124720 A1* | 6/2006 | Burbridge et al. ............ 235/375 |
| 2011/0116502 A1 | 5/2011 | Hamai |

FOREIGN PATENT DOCUMENTS

| JP | 2000 515352 | 11/2000 |
| JP | 2001 345799 | 12/2001 |
| JP | 2009 049916 | 3/2009 |
| WO | 2010 007798 | 1/2010 |

OTHER PUBLICATIONS

International Search Report Issued Aug. 10, 2010 in PCT/JP10/057734 Filed Apr. 23, 2010.

* cited by examiner

*Primary Examiner* — Andrew L Nalven
*Assistant Examiner* — Mohammed Waliullah
(74) *Attorney, Agent, or Firm* — Oblon, Spivak, McClelland, Maier & Neustadt, L.L.P.

(57) ABSTRACT

A data communication system and method in which a need to store a frame count value in a non-volatile memory and update the frame count value is obviated, and in which the effect resulting when a frame with its frame count value altered to a value close to a full count value is transmitted is reduced. When a valid frame count value is not held, an inquiry is made for a frame count value. The frame count value is notified from the receiving end, and the frame count value is acquired. An encryption key is generated on the basis of the frame count value. Data is encrypted with the encryption key. Data in a frame structure is transmitted. When the frame transmission ends, the frame count value is incremented.

13 Claims, 12 Drawing Sheets

DATA TRANSMITTING METHOD AND APPARATUS, AND DATA COMMUNICATION METHOD AND APPARATUS

TECHNICAL FIELD

This invention relates to a data transmitting method and apparatus, and a data communication method and apparatus which can be applied to, for example, remote control of electronic equipment by radio.

BACKGROUND ART

For remote controllers that control electronic equipment such as a television receiver, the ISM (Industrial, Scientific, and Medical use) band in the 2.4 GHz range offers an advantage in that use of radio frequency waves reduces the influence of a blocking object in comparison to the infrared mode, and also extends the reach distance. Recently, with regard to remote control in the radio frequency communication mode (referred to as RF mode as appropriate), a standard (referred to as RF4CE standard as appropriate) is being developed on the basis of an agreement reached between the Zigbee (registered trademark) Alliance and the RF4CE (Radio Frequency for Consumer Electronics: RF technology for consumer electronics products) Consortium.

Since radio waves are omni-directional, remote control in RF mode is susceptible to risks such as another person present nearby reading (skimming) transmit data, or operating electronic equipment by operating a false remote controller as if it were real (impersonation). In particular, recently, there are increasing instances where television receivers are connected to the Internet to do transactions with banks or shopping, and cash or credit card information is exchanged. The need for enhancing security is thus increasing.

PTL 1 describes that in remote control in RF mode, a common key for encryption is to be held by both the transmitting end and the receiving end in order to enhance security.

CITATION LIST

Patent Literature

PTL 1: Japanese Unexamined Patent Application Publication No. 2009-049916

"Overview of a Remote Control Communication System"

Next, the RF4CE standard will be described below mainly with regard to security. As shown in FIG. 1, a transmitting module 101 of a transmitting apparatus, for example, a remote controller 100, and a receiving module 201 provided in a receiving apparatus, for example, a television receiver 200 perform RF radio communication. A transmit antenna is denoted by 102, and a receive antenna is denoted by 202. A radio wave transmitted from the transmit antenna 102 to the receive antenna 202 will be referred to as RF remote control signal. In the case of two-way communication, one more set of transmitting module and receiving module is further added.

A signal corresponding to an operation on a key matrix 104 of the remote controller 100 is supplied to a transmit control section 103, and code generated by the transmit control section 103 is supplied to the transmitting module 101. The receiving module 201 receives a transmit signal via the transmitting module 101, the antenna 102, and the receive antenna 202. The receiving module 201 supplies the code to a receive control section 203. The receive control section 203 controls the operation of electronic equipment at the receiving end, for example, the television receiver 200 in accordance with the received code. In some actual implementations, configurations exist in which the transmitting module 101 and the transmit control section 103 are integrated together, and the receiving module 201 and the receive control section 203 are integrated together.

The remote controller 100 and the television receiver 200 perform two-way communication in a predetermined radio communication mode. As the communication mode according to the RF4CE standard, for example, IEEE (Institute of Electrical and Electronics Engineers)802.15.4 is used. IEEE802.15.4 is the name of a short distance wireless network specification called PAN (Personal Area Network) or W (Wireless) PAN.

The communication rate ranges from several ten k to several hundred kbp, and the communication distance ranges from several ten m to several hundred m. Also, communication is performed on a frame-wise basis. One frame is a maximum of 133 bytes in size, including the payload (0 to 127 bytes) plus the header (6 bytes).

Such a remote control system based on the RF4CE standard has a problem in that the system unintentionally controls equipment such as one installed in an adjacent room or adjacent house. Accordingly, when a television receiver is newly purchased and installed, it is necessary to establish one-to-one correspondence (referred to as pairing) to enable control of the television receiver by a commander. Pairing means that the remote controller and the electronic equipment to be controlled both exchange their IDs (identification information). Even when pairing is established, there are such risks that the own equipment is controlled by a malicious third party, and an RF signal is intercepted and secret information such as personal information is stolen.

In the RF4CE standard, as a measure against skimming whereby an RF remote control signal is received and information is stolen, the contents of code are rendered unintelligible even by monitoring the RF remote control signal. As a method to achieve this, the payload part that contains the code is encrypted. The value of a frame counter that never assumes the same value twice is employed as an encryption key for the payload part, thereby preventing the same key from being used on a frame-wise basis. The frame counter is incremented with every transmission.

Further, even when a frame of the RF remote control signal is captured, and the frame is transmitted again, that frame is not accepted. That is, a frame with a value that is the same as or smaller than a count value of the frame counter (referred to as frame count value) accepted in the past is not accepted. Through this process, it is possible to prevent the same frame from being received twice. Further, even when a frame is captured, and a frame with its frame count value set larger is sent, the encryption cannot be decrypted because the decryption key for the payload part does not match.

"Transmitting Module"

As shown in FIG. 2, code to be transmitted (payload data) is transmitted to the transmitting module 101 from the transmit control section 103, and a payload data reception section 105 receives the code. A frame counter 106 increments with a countup signal that is generated every time the payload data reception section 105 receives payload data. The frame count value generated by the frame counter 106 is held in a non-volatile memory. The frame count value is supplied to an exclusive-OR circuit (referred to as EX-OR gate) 107 together with key data held in a key storage section 108, and an encryption key is generated from the EX-OR gate 107.

Payload data from the payload data reception section 105 is supplied to an AES (Advanced Encryption Standard) encryption section 109. In the AES encryption section 109, the payload data is encrypted with the encryption key from the EX-OR gate 107. The encrypted payload data from the AES encryption section 109 is supplied to a framing section 110. In the framing section 110, data formatted as described later is constructed.

The output of the framing section 110 is supplied to a packetization section 111, and converted to a packet structure. The output data of the packetization section 111 is supplied to a modulation section 112. In the modulation section 112, a modulation process such as QPSK (Quadrature Phase Shift Keying) or spreading modulation is performed. Although not shown, an RF remote control signal is transmitted to the receiving module 201 via the transmit antenna and the receive antenna. The frame counter 106 is incremented when the frame transmission ends.

"Receiving Module"

As shown in FIG. 3, in the receiving module 201, an RF remote control signal is received from the transmitting module 101 via the transmit antenna and the receive antenna, although not shown. The received remote control signal is supplied to a demodulation section 204, and undergoes a demodulation process. The demodulated output of the demodulation section 204 is supplied to a packet sorting section 205, and packets are sorted. Conversely to the packetization section 111 of the transmitting module 101, the packet sorting section 205 performs a packet disassembly process.

The sorted packets are supplied to a frame analysis section 206. Conversely to the framing section 110 of the transmitting module 101, the frame analysis section 206 performs a frame disassembly process. A frame count value separated by the frame analysis section 206 is supplied to a frame count value check section 207. A frame count value retained in a frame count value storage section 208 is supplied to the frame count value check section 207.

The frame count value storage section 208 is formed by a non-volatile memory. In the frame count value check section 207, it is determined whether or not a received frame count value is an acceptable value. That is, the frame count value of a received frame and the retained frame count value at the receiving end are compared with each other. If the received frame count value is larger than the retained frame count value, the received frame count value is judged to be an acceptable value, and encrypted payload is sent to an AES decryption section 211. Otherwise, the received frame count value is determined to be unacceptable, so the entire received frame is discarded, and a state is entered in which reception of the next frame is waited for.

The frame count value determined to be an acceptable value in the frame count value check section 207 is supplied to an EX-OR gate 209. Key data held in a key storage section 210 is supplied to the EX-OR gate 209, and a decryption key is outputted from the EX-OR gate 209. Encrypted payload data separated by the frame analysis section 206 and the decryption key are supplied to the AES decryption section 211, and the payload data is decrypted and outputted. The decrypted payload data is supplied to a payload data transmission section 212, and transmitted to the receive control section 203. At the time when decryption is properly completed, and the payload is outputted, the frame count value of the received frame is retained in the frame count value storage section 208.

The number of bits of a frame counter 302 is defined as 4 bytes in the RF4CE standard. The frame count value is incremented from the value "1" with every transmission of a frame after pairing is established. Since the number of bits is 4 bytes, the count value does not become full in normal usage of the remote control, so a value that has been used once is never used again. The exclusive-OR of the key exchanged at the time of pairing and the count value of the frame counter is found, and the exclusive-OR output is used as the actual encryption key. Accordingly, encryption using the same value of key does not occur across all frames.

"Data Structure and Encryption/Decryption Process of One Frame"

The format of one frame of an RF remote control signal communicated between the transmitting module 101 and the receiving module 201 is as shown in FIG. 4A. A header part is located at the beginning of one frame, a frame counter (4 bytes) is inserted next, and further, code (encrypted payload data) such as a command is located. For the header part, the format prescribed in IEEE802.15.4 is used as it is. In the header part, a destination address (pan_id, short address) and a source address (pan_id, short address) are described.

To perform communication, one-to-one pairing is performed in advance, and addresses of both parties, and keys are exchanged at that time. The paired parties exchange keys of the same value generated by a random number immediately after the pairing, each hold each other's key, and use the key for encryption/decryption of payload in subsequent communications. Encrypted payload data is encrypted with an encryption key formed from a frame count value and a previously exchanged key. A CRC (cyclic redundancy code) for error detection is inserted at the end of one frame. The RF system is identified by the header. As the encryption algorithm, AES is used as an example.

A communication that sends one frame is a one-to-one communication in which the source and the destination are each uniquely limited to one. This is managed by addresses in the header part, and if a different source address/destination address is written in the header part, the corresponding frame is not received.

Encryption/decryption is performed in the manner as shown in FIG. 4B. Keys 301 and 310 exchanged at the time of pairing are retained in the respective non-volatile memories of the transmitting module 101 and receiving module 201. The keys 301 and 310 have the same value. In FIG. 2 and FIG. 3, the pieces of key data stored in the key storage section 108 and the key storage section 210 respectively correspond to the keys 301 and 310.

The frame counter 302 (the frame counter 106 in FIG. 2) of the transmitting module 101 is incremented every time a framing/transmission section 303 transmits one frame. An encryption key is generated by an EX-OR gate 304 (the EX-OR gate 107 in FIG. 2) from the frame count value of the frame counter 302 and the key data 301, and payload data is encrypted with the encryption key by an encryption section 305.

Data having the transfer format shown in FIG. 4A is transmitted from the framing/transmission section 303b to the receiving module 201. A frame reception/judgment section 311 judges whether or not the frame count value of the received frame is an acceptable value. To make the judgment, a frame count value retained in a frame count value storage section (4 bytes) 312 is used. When the received frame count value is larger than the retained frame count value, the received frame count value is judged to be an acceptable value, and encypted payload is sent to the AES decryption section 211. Otherwise, the received frame count value is determined to be unacceptable, so the entire received frame is discarded, and a state is entered in which reception of the next frame is waited for.

The encrypted payload data of a frame whose frame count value is determined to be an acceptable value in the frame reception/judgment section 311 is supplied to a decryption section 313, and the encrypted payload data is decrypted. A decryption key is generated by supplying the key 310 exchanged at the time of pairing and the frame count value retained in the frame count value storage section (4 bytes) 312 to an EX-OR gate 314.

Referring to FIG. 5, the flow of processing executed in accordance with the configuration shown in FIG. 4 will be described. In the transmitting module 101, transmit data occurs in step ST1. The transmit data has the above-described frame format. In step ST2, a frame count value is acquired from the frame counter 302 (non-volatile memory). In step ST3, an encryption key is generated on the basis of the frame count value and key data exchanged at the time of pairing. In step ST4, data (payload) is encrypted by the encryption section 305.

The encrypted data is converted to data structured in a frame format (step ST5). In step ST6, data in the frame format is transmitted. In step ST7, the count value of the frame counter 302 (non-volatile memory) is incremented. The data transmitting process ends with the series of processes mentioned above.

In the receiving module 201, data (RF remote control signal) transmitted from the transmitting module 101 is received (step ST11). The frame count value within the received frame is compared with a count value retained in the frame count value storage section (non-volatile memory) 31 (step ST12). Step ST12 is the process performed by the frame reception/judgment section 311.

When the received frame count value is larger than the retained frame count value, it is determined that the received frame is acceptable. In the case of an acceptable frame, the received encrypted payload is sent to the decryption section 313, and a decryption key is generated from the frame count value and key data exchanged at the time of pairing (step ST13). In step ST14, encryption is decrypted by the decryption section 313. The decrypted data is outputted to the receive control section. At the time when decryption is properly completed, and the payload is outputted, the frame count value of the received frame is retained in the frame count value storage section 312.

If the condition that the received frame count value be larger than the retained frame count value is not satisfied, it is determined that the received frame is unacceptable. When determined to be unacceptable, the entire received frame is discarded, and reception of the next frame is waited for. The data receiving process ends with the series of processes mentioned above.

SUMMARY OF INVENTION

Technical Problem

As described above, to implement the RF4CE standard, the value of the frame counter must be stored into respective non-volatile memories at both the transmitting end and the receiving end. The non-volatile memories are the frame counter 106 (302) of the transmitting module 101 and the frame count value storage section 208 (312) of the receiving module 201. If the count value is lost and returns to the original value (=1) in one of the transmitting module 101 and the receiving module 201, a problem arises in that it becomes impossible to either perform communication or maintain security.

"Problems Occurring when Using a Non-Volatile Memory"

A non-volatile memory is known to have the following characteristic features.

1. The number of erases after write is limited.
2. Subject to power supply voltage limitations at the time of write/erase.
3. Runaway occurring during write may lead to program destruction in some cases.
4. Information holding life after write exists in practical use.

A non-volatile memory having these characteristic features has been used to retain program data that is not subject to frequent rewrites. A non-volatile memory is not suited for uses in which, as in remote control systems, the remote controller is frequency operated, and the frame count value is frequently rewritten. Further, for remote controllers, it is common to use a battery as the power supply, and use of a battery power supply causes problems. Problems associated with use of a non-volatile memory will be described in detail below.

Problem 1 arising from the feature "1. The number of erases after write is limited" will be described. In the remote controller (transmitting end), the frame counter is updated every time a button is pressed. When the button is pressed continuously, it is necessary to update the frame counter and send the updated result every 50 msec. For example, when the user presses the button continuously for 1 second, the frame counter is updated 20 times.

If the updated value is held only in the RAM, when power supply stops due to contact failure of the battery that occurs abruptly, or when operation failure occurs due to electrostatic noise, the value in the RAM cannot be held. Even when the button is pressed after recovery of the power supply, it is impossible to know how much the frame counter has gone up, which means that a count value sent in the past is transmitted again, which cannot be accepted by the receiving end. As a result, a situation arises where operation using the remote controller does not work.

The same applies to the frame count value at the receiving end. If only the largest received count value is simply stored in the RAM, the held value can be erased by intentionally shutting off the power supply, for example. Unless the frame count value is stored in a non-volatile memory, it is impossible to ensure security and communication.

In actual systems, both the transmitting module and the receiving module are implemented by a one-ship microcomputer used for control. To store a frame count value into a non-volatile memory, the function of a flash memory included in the microcomputer chip is used. For microcomputers with no flash memory, a chip dedicated to non-volatile memory (EEPROM (Electrical Erasable Programmable ROM) or the like) is externally provided.

To update data in the flash memory, all of the data within the block to which the data to be updated belongs must be erased once. Accordingly, all of the data within the block in which the data to be updated is included is temporarily saved to a RAM that is a volatile memory. Updating of data is performed in the RAM. On the other hand, a block in the flash memory is erased, and the updated data is written to the already erased block. Both the flash memory and the EEPROM endure a limited number of writes/erases, and can be written/erased as few as several hundreds of times, or up to several tens of thousands of times at most, before reaching their end of life.

Provided that a write process is made to only a single area every time the count value of the frame counter is updated, the end of life is reached soon. For example, in a case where 100 writes/erases are guaranteed, the end of life in 5 seconds, and in a case where 10000 writes/erases are guaranteed, the end of life is reached in 500 seconds (a little over 8 minutes).

As an alleviating measure, the RF4CE standard specifies a measure such that operation works without problem if a write/erase is performed once every 1024 times. According to this specification, if the transmitting end forgets the count value held in the RAM that provides a work area, a frame is sent next time by adding a count value of 1024 to the value being held in the non-volatile memory. A situation where the count value is forgotten arises when, for example, a reset is applied to the microcomputer. Thus, operation works without problem even if a write is performed once every 1024 times. Such an alleviating measure extends the lifetime by approximately 1000 times. However, even this extended lifetime falls far short of the lifetime required for consumer equipment.

The lifetime of a non-volatile memory represents not the number of writes but the number of erases on an erase block basis. To increase the number of writes, when the size of the data to be written is small relative to the erase block (for example, about 1/10 or less), the erased block is split by the size of data. For example, one block of erase unit is set as 1 k byte, and the 1 k byte is divided in 4-byte units. Then, every time a write occurs, the write is made to one unit at a time. A method of increasing the number of writes in comparison to the number of erases in this way has been proposed. With this method, if the size of the erase block is 1000 times the size of the data to be written, the lifetime can be extended by nearly 1000 times because 1000 pieces of data can be written to one block. This method requires 1 k byte of non-volatile memory area with respect to the count value (4 bytes).

Further, there has been also proposed a method of using a plurality of erase blocks, and performing writes in a distributed fashion, thereby reducing the number of erases per one erase block. In this method, to obtain 10 times more lifetime, 10 times more erase block memory is required. Manufactures attempting to supply one-chip microcomputers for the RF4CE standard propose increasing the number of writes by use of the area within a single erase block a plurality of times, and by use of a plurality of erase blocks. However, some even require as much as 4 k bytes of non-volatile memory area with respect to the count value (4 bytes). As described above, the method of reducing the number of erases has a problem in that a large memory capacity is used.

Problem 2 arising from the feature "2. Subject to power supply voltage limitations at the time of write/erase" will be described. In a remote controller (commander), a battery is often used as the power supply. A short battery life means increased usage cost and more trouble in replacing a battery for the user. Thus, to minimize battery replacement, it is required to prolong the battery life.

The battery life can be improved in two ways: suppressing current and setting the voltage at which the battery becomes inoperable low. However, in cases where a flash memory is used as a function of a one-chip microcomputer, most of the times the specification is such that the voltage at the time of write/erase of the flash memory is higher than the operable voltage of the microcomputer.

As an example, a given microcomputer requires a power supply of 2.0 V or more as an operating voltage, and requires a power supply of 2.7 V at the time of write/erase of the flash memory. Therefore, in cases where a write/erase on the non-volatile memory occurs during normal usage as in the RF4CE standard, when the voltage of the battery becomes equal to or lower than the write/erase voltage for the flash memory, the battery reaches its end of life, and battery replacement occurs.

Problem 3 arising from the feature "3. Runaway occurring during write may lead to program destruction in some cases" will be described. A remote controller commonly uses a battery. It is necessary to consider cases where during use, a voltage is not supplied to the circuit due to contact failure or the like, with the result that the microcomputer program ceases to operate properly. Further, it is necessary to consider cases where the circuit or the program of the microcomputer ceases to operate properly due to static electricity or the like. Although the remote controller becomes inoperable in either of the cases, in the case of simple runaway of the microcomputer program, this is recovered by resetting the battery.

However, when program runway occurs while the non-volatile memory is being written/erased, if the program of the microcomputer is written in the flash memory, not only is it impossible to write data but the program itself is destroyed in some cases. When the program is destroyed, this cannot be recovered by resetting the battery, and the remote controller itself is to be replaced.

Problem 4 arising from the feature "4. Information holding life after write exists in practical use" will be described. There is a common method for increasing the number of writes on a non-volatile memory. According to this method, at the time of erase/write, the write time is reduced to thereby write information weakly. However, the data holding time becomes short with this write method. It is also possible to achieve optimization by striking a balance between the number of writes and the data holding life. However, such a method is not suited for cases where there are prolonged periods of non-use as in a remote controller.

"Problems in Terms of Counter Operation"

The frame counter is defined as 4 bytes in the RF4CE standard. Accordingly, the frame counter can count up to 4294967295 (approximately 4.2 billion) steps, which is an amount equivalent to approximately 6.8 years even when the count goes up by 1 every 50 msec assuming that a button of the remote controller is pressed continuously. Thus, count-full does not occur in normal usage.

However, assume that a person with a malicious intent has intercepted a frame of an RF remote control signal, and has sent, to the receiving end, a frame whose frame counter value has been altered to be close to a count-full value. In this case, the counter value at the receiving end increases in a stroke, causing such problems as an authorized remote controller becoming inoperable, and a decrease in the number of possible receptions at the receiving end.

Accordingly, the object of this invention is to provide a data transmitting method and apparatus, and a data communication method and apparatus, which make it possible to solve the problems associated with a non-volatile memory, and the problems associated with a frame counter as described above.

Solution to Problem

To solve the above-described problems, this invention relates to a data transmitting method including:

an inquiring step of making an inquiry to a receiving apparatus when a count value is invalid, receiving a first random number generated in the receiving apparatus, and storing a count value n that is first generated from the first random number into a volatile memory;

an encrypting step of encrypting data to be transmitted by the count value n;

a transmitting step of transmitting data in a frame format including the count value n and the encrypted data; and a count value changing step of changing the count value stored in the volatile memory, every time data is transmitted, in which when the changed value exceeds a set range, an inquiry is made to the receiving apparatus, a second random number different from the first random number generated in the receiving apparatus is received, and a count value n' (≠n) that is first generated from the second random number is stored into the volatile memory, and the encrypting step, the transmitting step, and the count value changing step are repeated by using the count value n'.

This invention relates to a data transmitting apparatus including:

inquiring means for making an inquiry to a receiving apparatus when a count value is invalid, receiving a first random number generated in the receiving apparatus, and storing a count value n that is first generated from the first random number into a volatile memory;

encrypting means for encrypting data to be transmitted by the count value n;

transmitting means for transmitting data in a frame format including the count value n and the encrypted data; and count value changing means for changing the count value stored in the volatile memory, every time data is transmitted, in which when the changed value exceeds a set range, an inquiry is made to the receiving apparatus, a second random number different from the first random number generated in the receiving apparatus is received, and a count value n' (≠n) that is first generated from the second random number is stored into the volatile memory, and an encrypting process by the encrypting means, a transmitting process by the transmitting means, and a count value changing process by the count value changing means are repeated by using the count value n'.

This invention relates to a data communication method which performs communication via a radio channel capable of two-way communication between a transmitting apparatus and a receiving apparatus, in which:

a data transmitting method includes an inquiring step of making an inquiry to the receiving apparatus when a count value is invalid, receiving a first random number generated in the receiving apparatus, and storing a count value n that is first generated from the first random number into a volatile memory, an encrypting step of encrypting data to be transmitted by the count value n, a transmitting step of transmitting data in a frame format including the count value n and the encrypted data, and a count value changing step of changing the count value stored in the volatile memory, every time data is transmitted, in which when the changed value exceeds a set range, an inquiry is made to the receiving apparatus, a second random number different from the first random number generated in the receiving apparatus is received, and a count value n' (≠n) that is first generated from the second random number is stored into the volatile memory, and the encrypting step, the transmitting step, and the count value changing step are repeated by using the count value n'; and a data receiving method includes an inquiry response step of receiving the inquiry, and transmitting the first random number to the receiving apparatus, a receiving step of receiving the data in the frame format transmitted in the transmitting step, a determining step of determining whether or not the count value received has increased or decreased from a value being held, and falls within the set range, a decrypting step of generating a decryption key by using the received count value when it is determined in the determining step that the received count value matches the count value being held, and decrypting encrypted data within a received frame with the generated decryption key, and discarding the received frame when it is determined that the received count value does not match the count value being held, and a count value changing step of changing the value being held, when the encrypted data within the frame is decrypted.

This invention relates to a data communication apparatus which performs communication via a radio channel capable of two-way communication between a transmitting apparatus and a receiving apparatus, in which:

a data transmitting apparatus includes inquiring means for making an inquiry to the receiving apparatus when a count value is invalid, receiving a first random number generated in the receiving apparatus, and storing a count value n that is first generated from the first random number into a volatile memory;

encrypting means for encrypting data to be transmitted by the count value n;

transmitting means for transmitting data in a frame format including the count value n and the encrypted data; and count value changing means for changing the count value stored in the volatile memory, every time data is transmitted, in which when the changed value exceeds a set range, an inquiry is made to the receiving apparatus, a second random number different from the first random number generated in the receiving apparatus is received, and a count value n' (≠n) that is first generated from the second random number is stored into the volatile memory, and an encrypting process by the encrypting means, a transmitting process by the transmitting means, and a count value changing process by the count value changing means are repeated by using the count value n'; and a data receiving apparatus includes inquiry response means for receiving the inquiry, and transmitting the first random number to the receiving apparatus, receiving means for receiving the data in the frame format transmitted by the transmitting means, determining means for determining whether or not the count value received has increased or decreased from a value being held, and falls within the set range, decrypting means for generating a decryption key by using the received count value when it is determined by the determining means that the received count value matches the count value being held, and decrypting encrypted data within a received frame with the generated decryption key, and discarding the received frame when it is determined that the received count value does not match the count value being held, and count value changing means for changing the value being held, when the encrypted data within the frame is decrypted.

Advantageous Effects of Invention

According to this invention, since neither the transmitting end nor the receiving end needs to store the frame count value in a non-volatile memory, there is an advantage in that the above-described problems associated with a non-volatile memory do not occur. In this invention, even when the frame count value is altered to a value close to a full count value, the resulting effect can be reduced.

DESCRIPTION OF EMBODIMENTS

Hereinbelow, embodiments of this invention will be described. It should be noted that the description will be given in the following order.
<1. Reference Example>
<2. First Embodiment>
<3. Modifications>

It should be noted that the embodiments described below are preferred specific examples of this invention, and although various technically preferred limitations are given, the scope of the invention is not to be limited to these embodiments unless it is particularly stated in the following description that such embodiments limit this invention.

1. Reference Example

Figure 6:
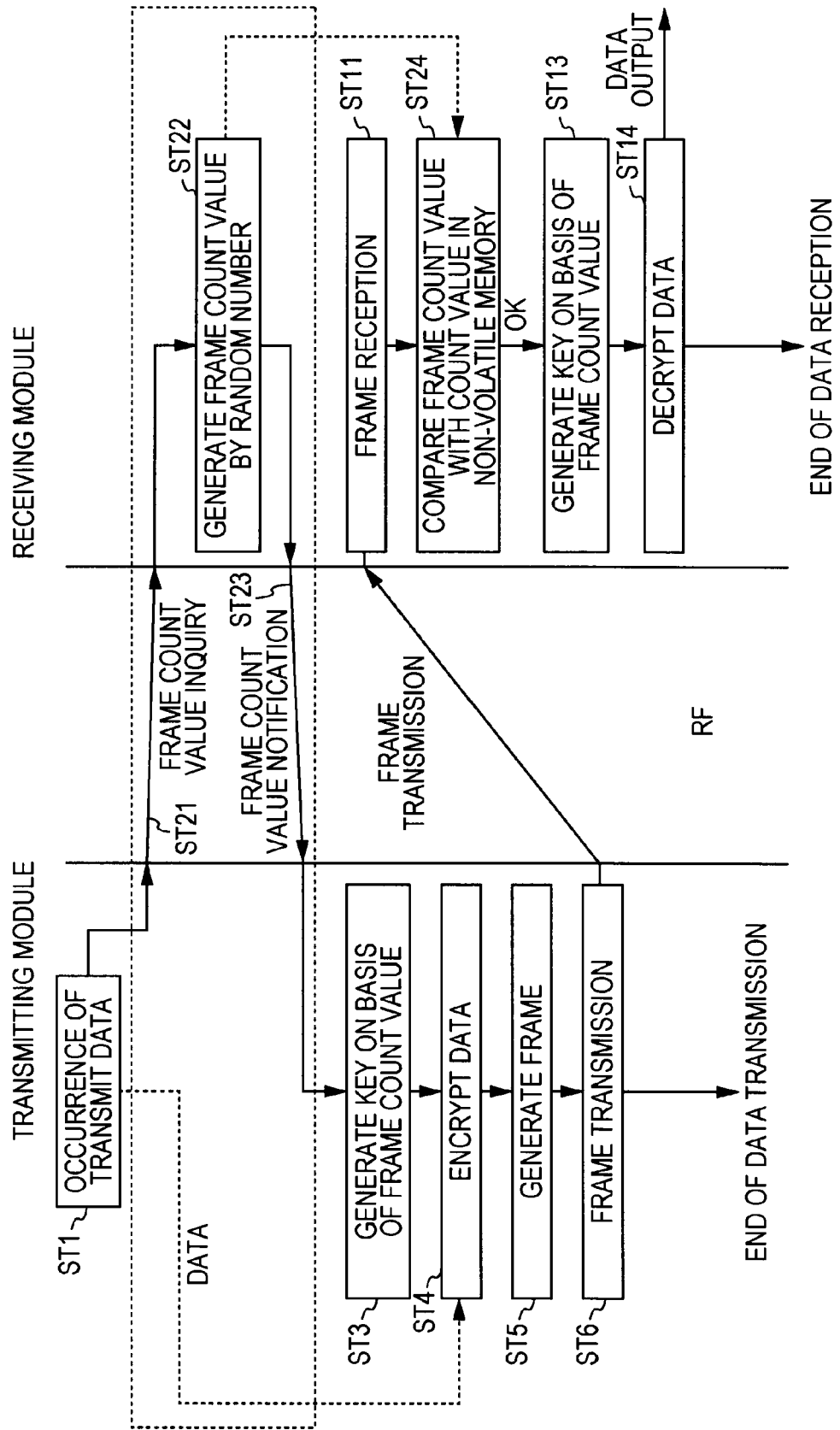
FIG. 6 is a sequence diagram showing the flow of processing according to this invention.

To facilitate understanding of this invention, a reference example will be described with reference to FIG. 6. In the transmitting module 101, transmit data occurs in step ST1. The transmit data has the transfer format as described with reference to FIG. 4A. When the transmit data occurs, an inquiry is made to the receiving module 201 for a frame count value (step ST21).

Upon receiving the inquiry, the receiving module 201 generates a random number by a hardware or software random number generator. The random number is retained in a volatile memory, for example, a RAM in the receiving module, and the transmitting module 101 is notified of the random number as the frame count value (step ST23). As bounded by the broken line, the frame count value inquiring step ST21, the frame count value generating step ST22, and the frame count value notifying step ST23 are added processes.

By using the frame count value received in step ST23, an encryption key is generated (step ST3), data (payload) is encrypted (step ST4), and the encrypted data is converted to data structured in a frame format (step ST5). In step ST6, data in the frame format is transmitted. The data transmitting process ends with the series of processes mentioned above. No non-volatile memory for storing the frame count value is necessary.

In the receiving module 201, the data transmitted from the transmitting module 101 is received (step ST11). The frame count value within the received frame is compared with a count value retained in a frame count value storage section (a volatile memory, for example, a RAM) (step ST24). That is, it is determined whether or not the frame count value within the received frame and the retained frame count value match.

When the received frame count value matches the retained frame count value, it is determined that the received frame is acceptable. In the case of an acceptable frame, a decryption key is generated from the frame count value and key data exchanged at the time of pairing (step ST13). In step ST14, encryption is decrypted.

If the condition that the received frame count value match the retained frame count value is not satisfied, it is determined that the received frame is unacceptable. When determined to be unacceptable, the entire received frame is discarded, and reception of the next frame is waited for. The data receiving process ends with the series of processes mentioned above.

In the above-described reference example, after paring, even if the frame counter value is not retained in a non-volatile storage when transmitting and receiving frames, an equivalent level of security can be obtained. While the foregoing description has been given by defining the transmitting end and the receiving end, as the standard of the physical layer used in the RF4CE standard, IEEE802.15.4 is used. This standard includes a two-way communication function. Accordingly, the receiving end is also capable of two-way communication for sending data to the transmitting end.

In the reference example, a frame count value is generated by a random number at the receiving end, the transmitting end inquires for the value, and the returned value is used as the frame count value. Thus, at the transmitting end, even in the event of loss of a counter value, it suffices to simply make an inquiry to the receiving end, so there is no need to store the count value in a non-volatile memory. On the other hand, at the receiving end as well, a random number is generated upon arrival of an inquiry from the transmitting end, the value is returned to the transmitting end, and the returned value is set as the next receivable value, so there is no need for non-volatile storage of the count value.

When making an inquiry for the frame counter, there is no particular need for encryption. Even when this value is stolen by interception, if an authorized transmission section immediately performs a transmission using this value, the value becomes unusable thereafter, and it is thus possible to maintain security.

2. First Embodiment

"Overview of an Embodiment of this Invention"

In the reference example, upon every transmission of a frame, the transmitting end is to inquire the receiving end for the frame count value. Accordingly, a "frame counter inquiring step" and a "frame count value notifying step" are added to what is originally only a frame transmission, which may cause a decrease in frame transfer efficiency, or a decrease in response speed due to the time required for the random number generating process.

In an embodiment of this invention, when an inquiry for a frame count value is made once, on the basis of the obtained count value, the receiving end accepts frames until a given set count value is reached, thereby making it possible to reduce the number of times the "frame counter inquiring step" is to be performed.

Figure 7:
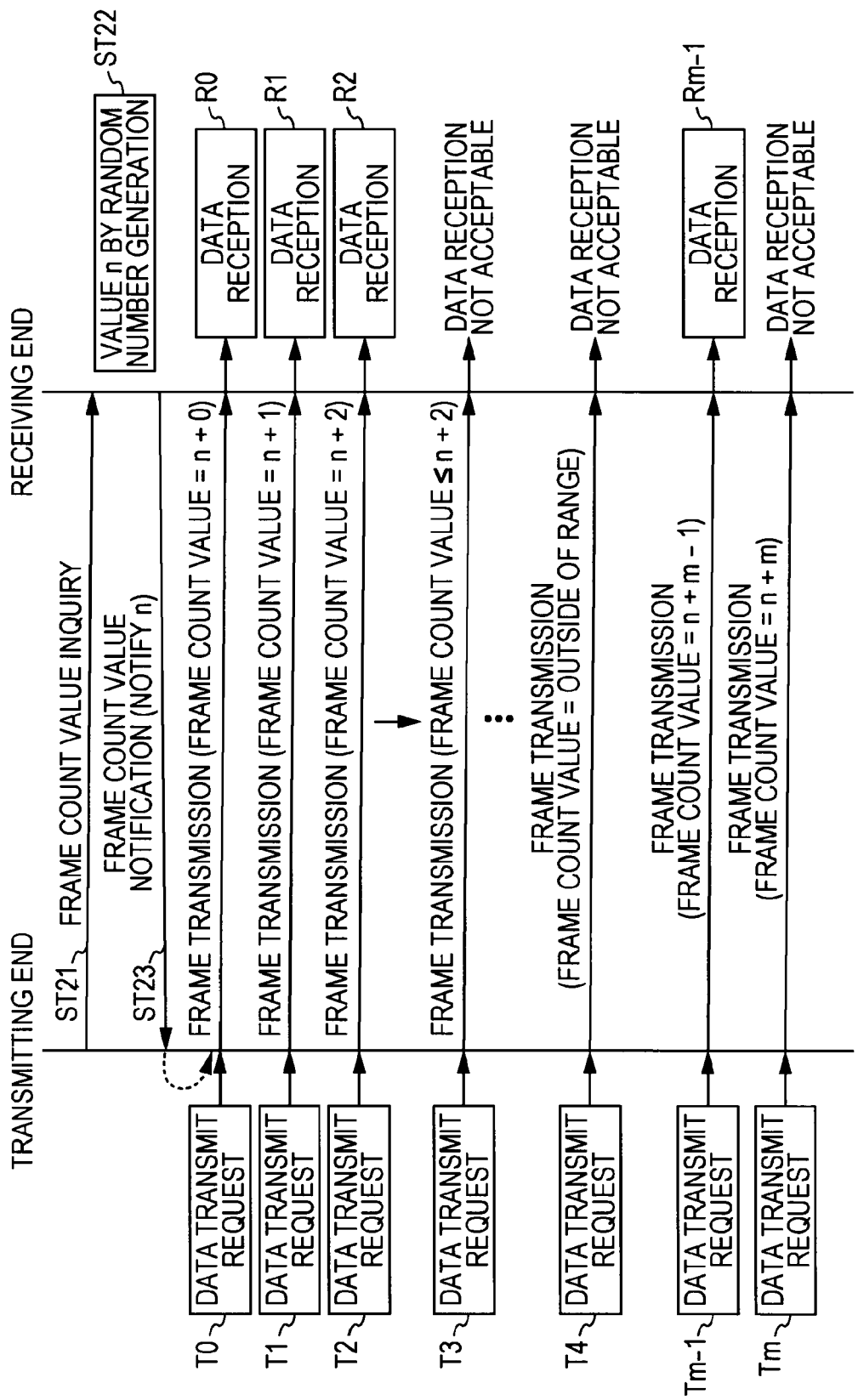
FIG. 7 is a sequence diagram showing the flow of processing according to this invention.

As shown in FIG. 7, in a state where a valid frame count value is not held, an inquiry is made for a frame count value (step ST21). At the receiving end, a random number n is generated (step ST22). The random number n is transmitted from the receiving end to the transmitting end (step ST23).

Upon occurrence of the first data transmit request T0, data is encrypted with a frame count value n, a frame including the frame count value n and the encrypted data is transmitted, and the frame is received (data reception R0). The frame count value at the receiving end is set to (+1). As a result, the lower limit value of the acceptable range is incremented by 1, and a range of not less than (n+1) and not greater than (n+m−1) is set as the acceptable range.

Next, when a data transmit request T1 occurs, the frame count value is set to (n+1), and transmitted. Upon data reception R1, since the frame count value matches the retained frame count value, so the received data is judged to be acceptable data, and decrypted. The frame count value at the receiving end is set to (n+1). As a result, the lower limit value of the acceptable range is incremented by 1, and a range of not less than (n+2) and not greater than (n+m−1) is set as the acceptable range.

In this way, with every data transmit request, the frame count value at the transmitting end is incremented. At the receiving end, the frame count value is incremented with every data reception. The incremented value is held in a RAM (volatile memory) until the "frame counter inquiring step" is performed next time. Upon generating the random number n in response to the "frame counter inquiring step", the receiving end sets the range of acceptable values of the frame counter to be sent next to a range of not less than n and not greater than (n+m−1). As for the value of m, a fixed value is set by the system, or this is exchanged in advance between the transmitting end and the receiving end. For example, the value of m may be transmitted from the receiving end together with the random number n.

The receiving end receives, as acceptable data, only frames having frame count values that fall within the range from the frame count value n issued by the receiving end itself to (n+m−1), and are larger than already received values. For example, with regard to a data transmit request T3 in FIG. 7, since frame count values of not less than (n+3) and not greater than (n+m−1) fall within the acceptable range, frames with frame count values of not greater than (n+2) are determined as not being acceptable data. For example, when, upon data transmit request T4, a frame whose frame count value falls outside the range of (n to n+m−1) is transmitted, the frame is discarded as not being acceptable data at the receiving end.

When, after having transmitted frames m times, the transmitting ends transmits a frame having a frame count value (n+m) at the (m+1)-th time, the transmitting end knows that the receiving end will not receive that frame. Accordingly, an inquiry is made again for a frame count value in advance, and a random number n' different from n is acquired as the frame count value.

The value of the range m of frame count values indicating acceptable data can be set in an arbitrary manner. However, a small value of m increases the number of times the "frame counter inquiring step" is performed, resulting in a decrease in transfer efficiency. A large value of m aggravates the effect exerted when a malicious third party intercepts the RF remote control signal and transmits a frame whose frame count value has been altered to a value close to a count-full value. In this case, the frame count value abruptly increases, making it impossible for an authorized remote controller to operate.

An appropriate value of m is, for example, about 1024. With such a value, if a frame whose frame count value has been altered to a value close to a count-full value is transmitted, the button of the remote controller may simply be pressed continuously. Since a frame occurs every 50 msec, for example, a "frame counter inquiring step" will occur anew in about several seconds, thus enabling recovery. Further, since the frame counter is generated by a random number, strictly speaking, there is a fear of the same value being used twice. However, in the case of 4 bytes, about 4.2 billion random numbers can be generated, so the probability of coincidence of a single random number occurring within the usage period is extremely low.

The number of bits of the frame counter is not limited to 4 bytes, but may be set to an appropriate length depending on the required level of security. Further, the whole 4 bytes of the frame counter is set as a random number. Alternatively, for example, if m is set as 1024 (the 10th power of 2), 22 bits out of the 4 bytes (32 bits) may be assigned as a random number, and 10 bits on the least significant side may be assigned as a count value that is incremented.

"Configuration and Operation at the Transmitting End"

Figure 1:
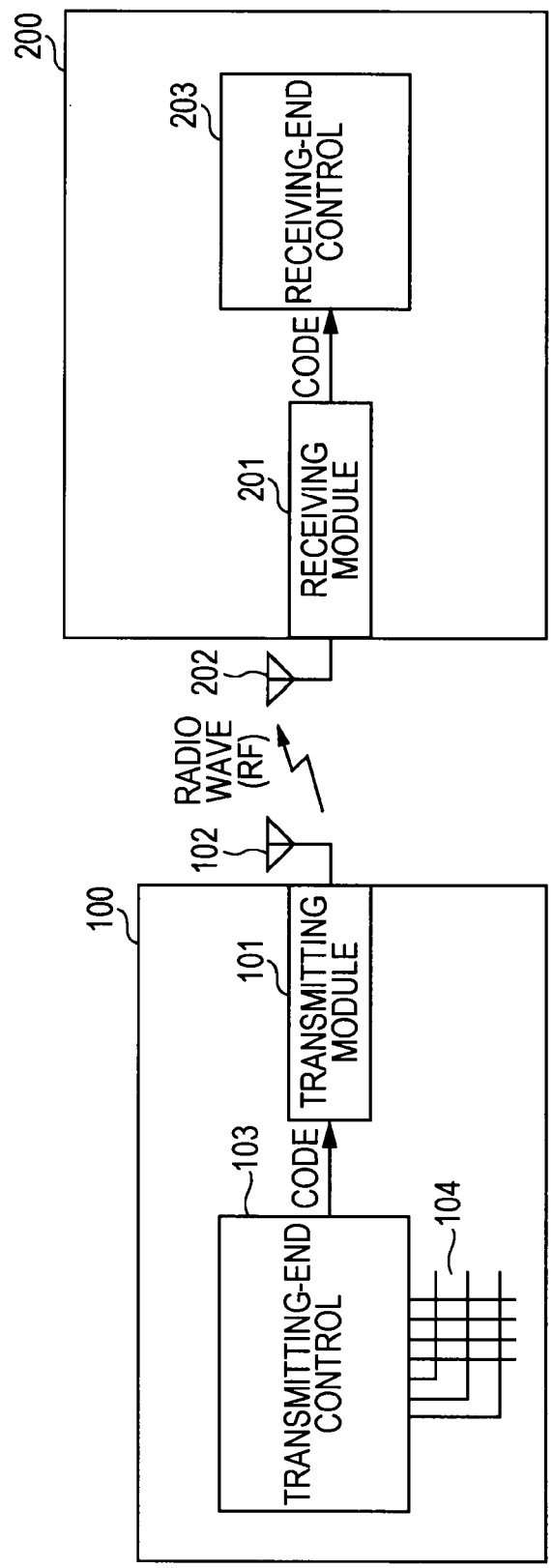
FIG. 1 is a block diagram showing a general configuration of a communication apparatus to which this invention can be applied.
Figure 2:
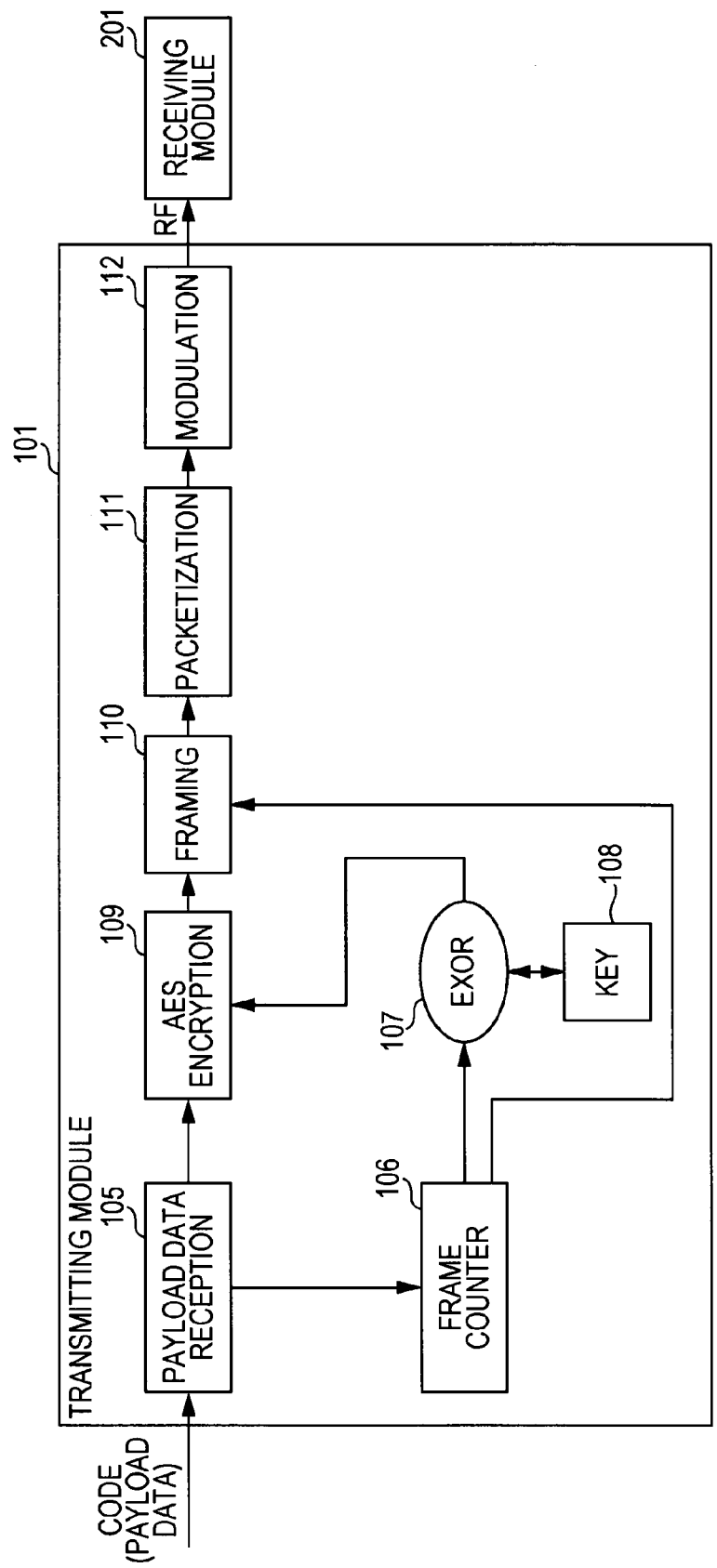
FIG. 2 is a block diagram of an example of a transmitting apparatus to which this invention can be applied.
Figure 3:
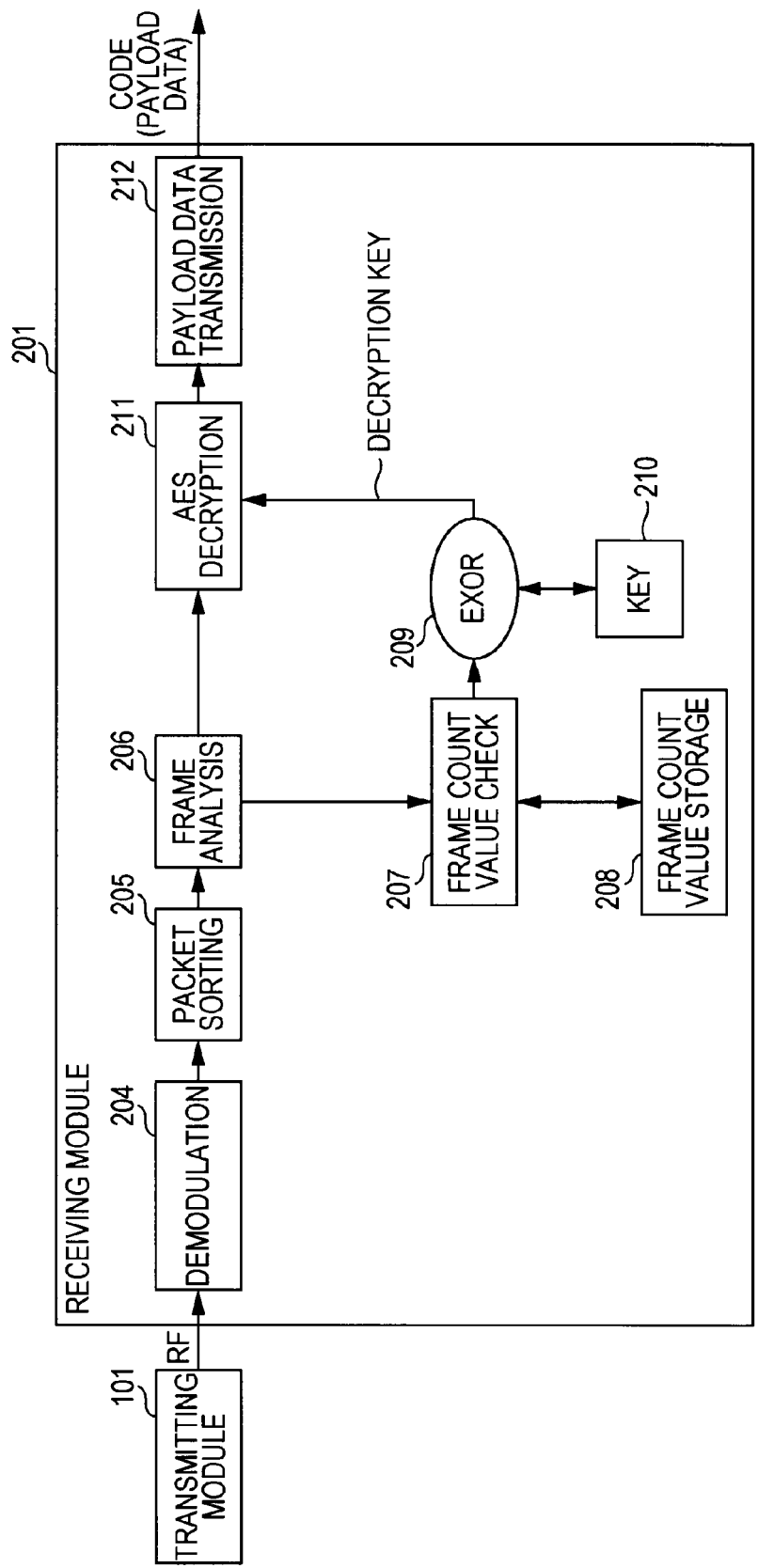
FIG. 3 is a block diagram of an example of a receiving apparatus to which this invention can be applied.
Figure 8:
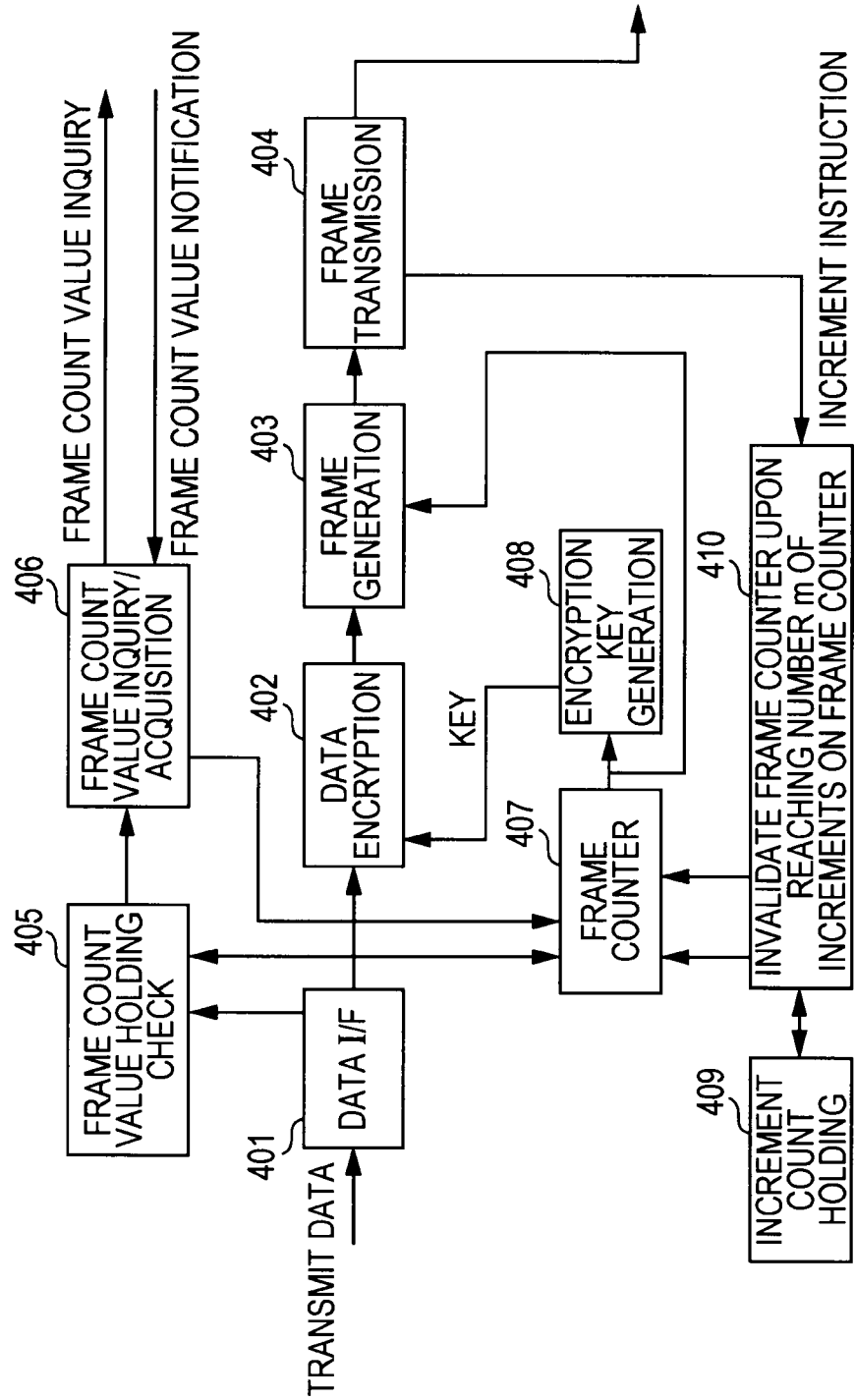
FIG. 8 is a block diagram used for explanation of a transmitting end (remote controller) according to a first embodiment of this invention.

Referring to FIG. 8, a description will be given of the configuration of the transmitting module (remote controller) according to an embodiment of this invention. The overall system configuration according to an embodiment of this invention is the same as that described with reference to FIG. 1. The remote controller 100 is provided with the transmit control section 103, and a command (code) for remote control is generated when the user operates the key matrix. Further, the remote controller 100 uses a battery as a power supply.

Figure 4:
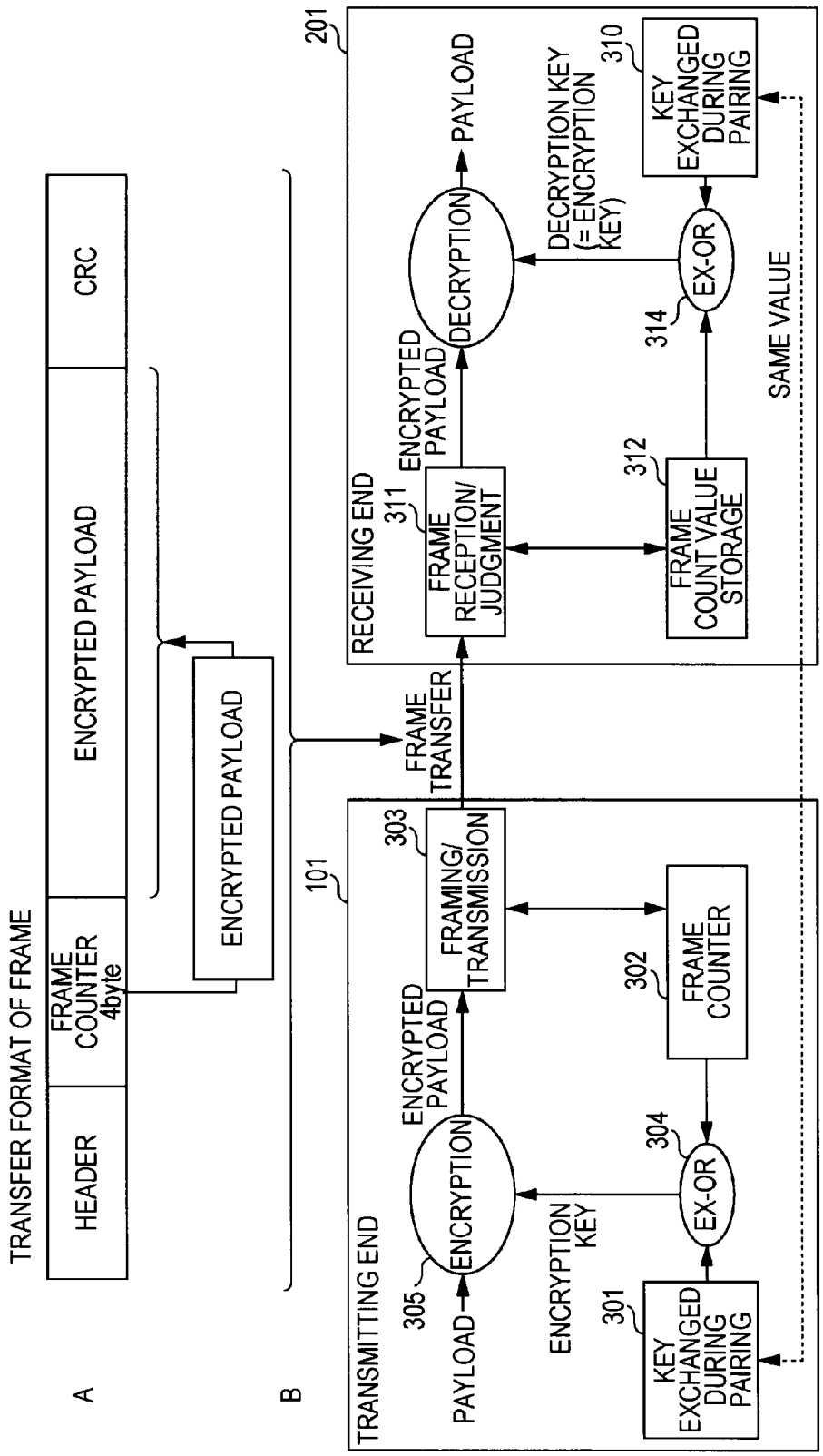
FIG. 4 is a schematic diagram showing a frame format according to a reference example used for explanation of this invention, and is a schematic diagram for explanation of processing.
Figure 5:
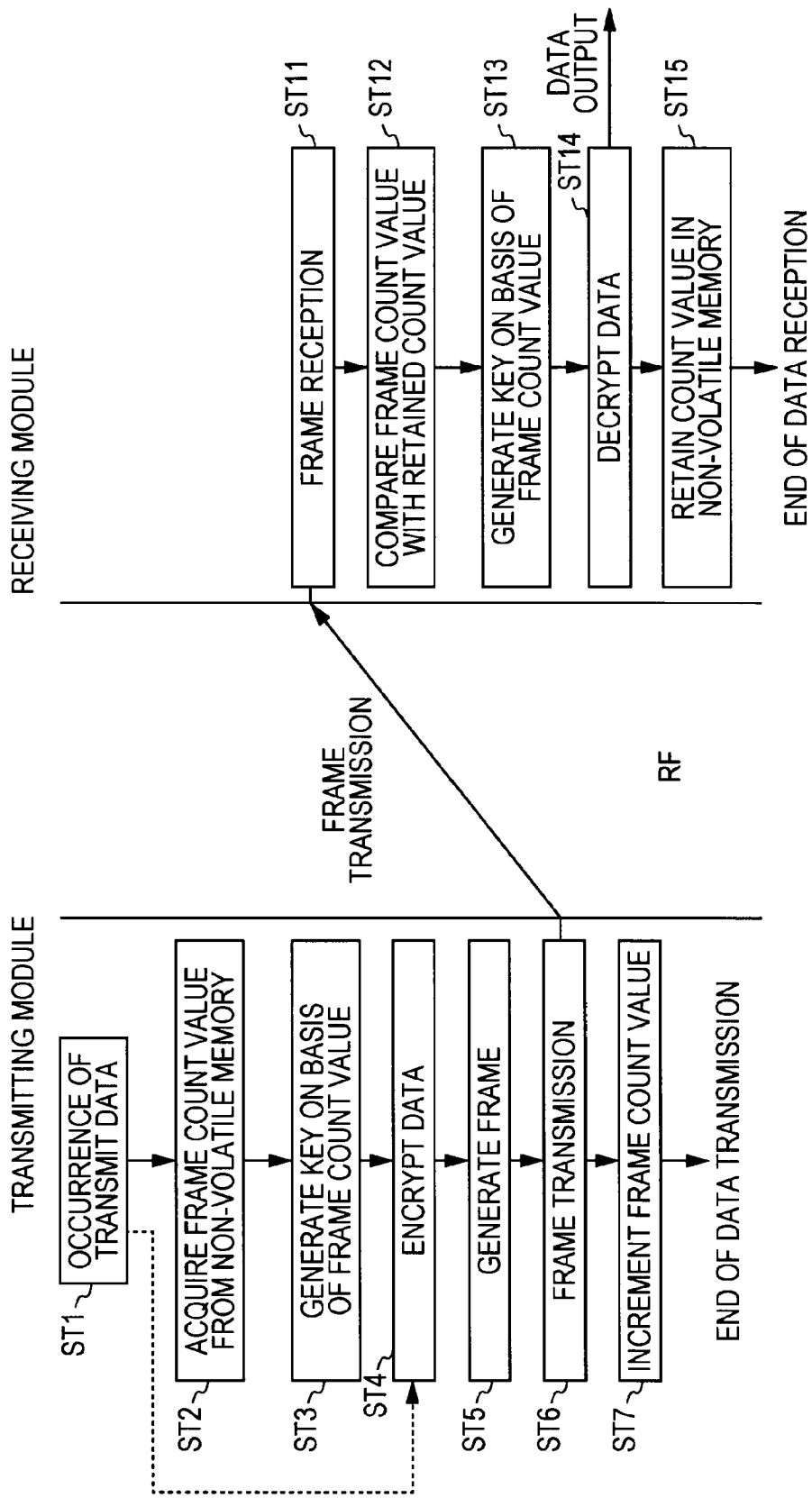
FIG. 5 is a sequence diagram showing the flow of processing according to the reference example.

Code to be transmitted (payload data) from the transmit control section is supplied to a data interface 401. The payload data is encrypted in a data encryption section 402 of AES, for example. The encrypted payload data from the data encryption section 402 is supplied to a frame generation section 403. In the frame generation section 403, data formatted as shown in FIG. 4A is constructed. The data from the frame generation section 403 is supplied to a frame transmission section 404, and the output data of the frame transmission section 404 is transmitted to the receiving module.

In the frame transmission section 404, processes such as packetization of transmit data, modulation, and the like are performed. Although not shown, an RF remote control signal is transmitted to the receiving module via the transmit antenna and the receive antenna. When the frame transmission ends, an increment instruction is supplied to a frame counter control section 410.

In the data interface 401, a data occurrence notification for notifying occurrence of transmit data is generated, and the data occurrence notification is supplied to a frame count value holding check section 405. The frame count value holding check section 405 determines whether or not a valid frame count value is held in a frame counter 407. The frame counter 407 is, for example, 4 bytes in length. The frame counter 407 increments with the increment instruction from the frame counter control section 410, and its contents are set to an invalid value by an invalidation instruction from the frame counter control section 410.

A frame count value is not valid (invalid) when the frame count value is 0, the maximum countable value, or a predetermined value that is not used. Cases when the frame count value assumes any one of these values are defined as invalid. Accordingly, when the frame count value of the frame counter 407 assumes any one of these values, the frame count value holding check section 405 determines that the frame count value is invalid.

Upon determining that the frame count value of the frame counter 407 is invalid, the frame count value holding check section 405 instructs a frame count value inquiry/acquisition section 406 to make an inquiry. With this instruction, an inquiry is made for a frame count value, and notification of the frame count value is received. The acquired frame count value is set in the frame counter 407. Two-way communication for making an inquiry for a frame count value and notifying the frame count value is performed by the same communication used for payload data. However, encryption, processing using a frame count value, or the like is not performed. It should be noted, however, that an encryption process or another processing using a frame count value may be performed separately from communication related to payload data.

The count value of the frame counter 407 is supplied to an encryption key generation section 408. In the encryption key generation section 408, an encryption key is generated by the exclusive-OR of the frame count value and key data held in a key storage section. The encryption key is supplied to the data encryption section 402, and payload data is encrypted. Further, the generated frame count value is supplied to the frame generation section 403, and inserted into the transmit data of one frame.

The frame counter control section 410 generates a signal for incrementing the frame counter 407, and the number of increments is held in an increment count holding section 409 formed by a volatile memory, for example, a RAM of a microcomputer chip. When the number of increments reaches m, the frame counter control section 410 supplies an invalidation instruction to the frame counter 407, thereby invalidating the value of the frame counter 407.

Figure 10:
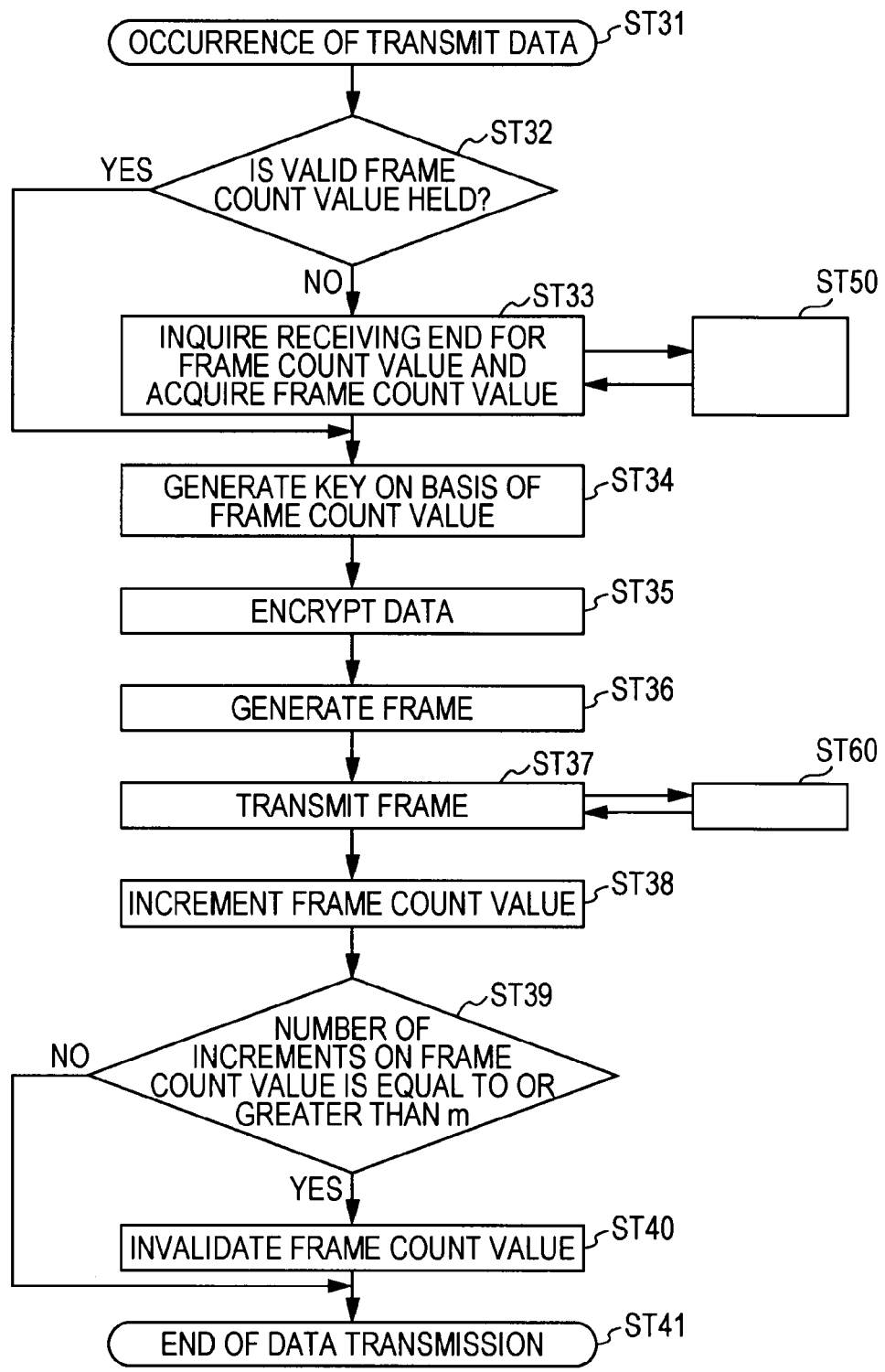
FIG. 10 is a flowchart showing the flow of processing at the transmitting end according to the first embodiment of this invention.

Processing in the transmitting module will be described with reference to the flowchart in FIG. 10. This processing is performed by the components (hardware and/or software) shown in FIG. 8. In step ST31, transmit data occurs. When the transmit data is supplied to the data interface 401, it is determined by the frame count value holding check section 405 whether or not a valid frame count value is held (step ST32).

If it is determined that a valid frame count value is held, the processing proceeds to step ST34. If a valid frame count value is not held, in step ST33, an inquiry is made for a frame count value. The frame count value is notified by the process ST50 at the receiving end, and the frame count value is acquired. Step ST33 is a process performed by the frame count value inquiry/acquisition section 406.

In step ST34, an encryption key is generated by the encryption key generation section 408 on the basis of the valid frame count value or the acquired frame count value. In step ST35, data (payload data) is encrypted with the encryption key by the data encryption section 402. One frame of data is generated from the encrypted payload, the frame count value, the header part, and the like by the frame generation section 403 (step ST36).

The generated data in a frame structure is supplied to the frame transmission section 404, and in step ST37, an RF remote control signal is transmitted by the frame transmission section 404. The receiving end performs a receive process ST60 of the transmitted RF remote control signal. Although step ST37 for frame transmission does not require two-way communication, two-way communication is performed in the case where an instruction to invalidate the frame counter is to be made from the receiving end to the transmitting end.

When the frame transmission ends, in step ST38, the frame count value is incremented by the frame counter control section 410. In step ST39, it is determined by the frame counter control section 410 whether or not the number of increments on the frame counter is equal to or greater than m. If it is determined that the number of increments is not greater than m, data transmission ends (step ST41). Then, a state is entered in which occurrence of transmit data in response to pressing of a button by the user is waited for. If it is determined in step ST39 that the number of increments is m or more, since the upper limit value is reached, in step ST40, the frame count value is invalidated. Then, the data transmitting process ends (step ST41).

"Configuration and Operation at the Receiving End"

Figure 9:
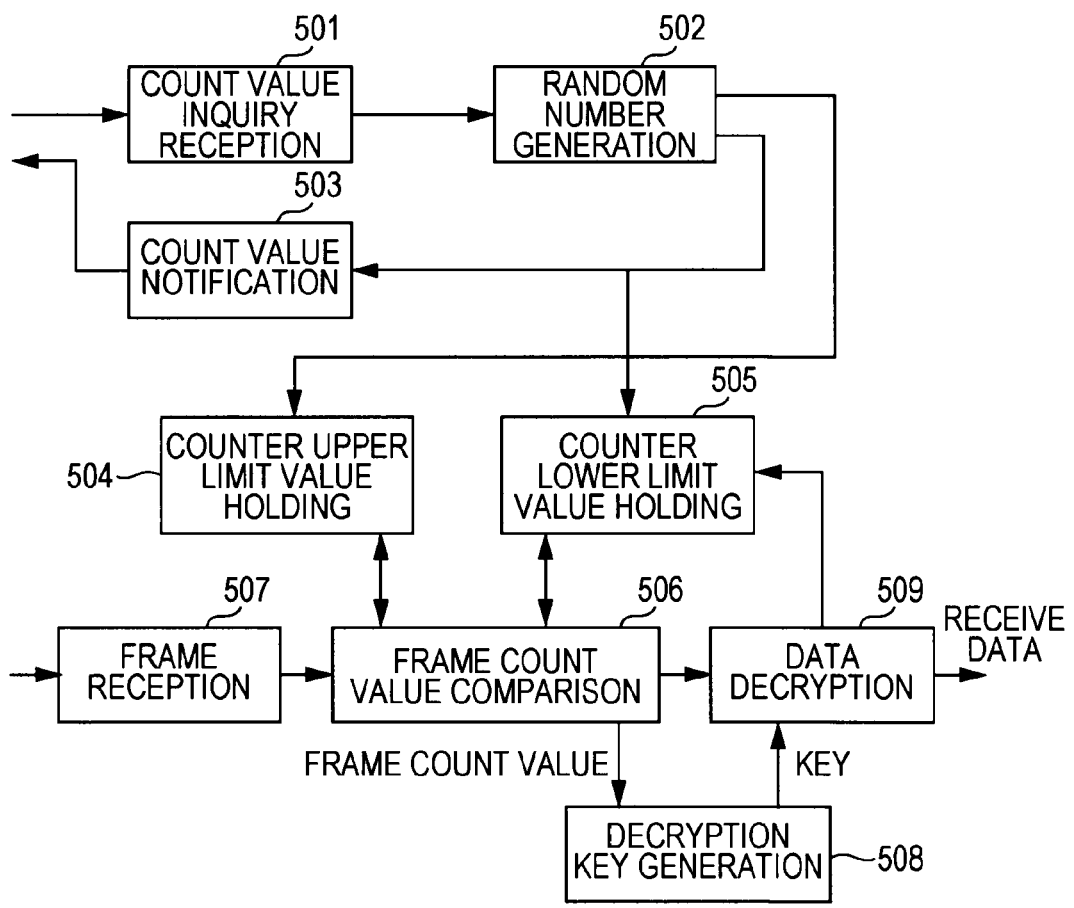
FIG. 9 is a block diagram used for explanation of a receiving end according to the first embodiment of this invention.

Referring to FIG. 9, a description will be given of the configuration of the receiving module (provided in electronic equipment such as a television receiver) according to an embodiment of this invention. A frame count value inquiry from the transmitting module is received by a count value inquiry reception section 501. In response to reception of the inquiry, the count value inquiry reception section 501 supplies an instruction to generate a random number to a random number generation section 502. The generated random number serves as the initial value (represented by n) of the frame count value. This random number is supplied to a count value notification section 503, and notification of the initial value of the count value is made to the transmitting end.

The initial value n of the count value is supplied to a counter lower limit value holding section 505. Letting m (0, 1, ..., m−1) represent the range of variation of the frame count value being set, a value (n+m−1) equal to the initial value of the count value plus (m−1) is the upper limit value of a valid count value. The counter upper limit value is held in a counter upper limit value holding section 504. The counter upper limit value holding section 504 and the counter lower limit value holding section 505 are each formed by a volatile memory, for example, a RAM of a microcomputer chip.

Every time a frame is received, the frame count value held in the counter lower limit value holding section 505 is updated to a value obtained by adding 1 to the received frame count value. As for the value to be added, a set value (a value other than 1) may be added every time a frame is received. In this case, the frame count value is changed similarly at the transmitting end.

Although not shown, an RF remote control signal is supplied to a frame reception section 507 from the transmitting module via the receiving antenna. In the frame reception section 507, processes such as demodulation of the received data, packet disassembly, and frame disassembly are performed. In a frame count value comparison section 506, it is determined whether or not the frame count value (represented by y) within the received frame falls within an acceptable range.

The lower limit value (n+x) (x=0, 1, 2, ... ) of the count value and the upper limit value (n+m−1) of the count value are supplied to the frame count value comparison section 506. In the case where the relationship (n+x)≤y≤(n+m−1) is satisfied, the frame count value comparison section 506 determines that the received frame count value y falls within an acceptable range. Otherwise, the received frame count value y is determined to be an unacceptable value. If determined to be acceptable as a result, the frame count value y is supplied to a decryption key generation section 508, and the received payload data is supplied to a data decryption section 509. If determined to be unacceptable as a result, the data of the received frame is discarded, and the whole acceptable range is invalidated.

In the decryption key generation section 508, a decryption key is generated by the exclusive-OR of the frame count value y and key data held in the key storage section. The decryption key is supplied to the data encryption section 509, and payload data is decrypted. Further, an instruction for causing the counter lower limit value holding section 505 to increment (+1) the lower limit value being held occurs. The decrypted data is supplied to the receive control section 203 (see FIG. 1), and the electronic equipment is remote controlled.

It should be noted that immediately after initialization (reset) at the receiving end, the counter values being held (the upper limit value and the lower limit value) become invalid until a valid count value is set by a "frame counter inquiring step" or the like at the transmitting end. When the counter values being held (the upper limit value and the lower limit value) are invalid, it is impossible for the receiving end to judge whether or not the value of the frame counter being sent is correct. As a result, it becomes impossible to receive a frame.

In this case, if the transmitting end keeps transmitting data until the frame count value becomes full count, a "frame counter inquiring step" occurs, a new frame count value is set at each of the transmitting and receiving ends, thus effecting recovery. However, if the value m is large, a long time is required until the frame count value at the transmitting end becomes full count and the "frame counter inquiring step" occurs.

As a measure against this problem of delayed recovery, in the case where frame data is received by the receiving end when the counter values being held at the receiving end are invalid, a signal instructing invalidation of the frame counter at the transmitting end is sent to the transmitting end. In accordance with the signal instructing invalidation, the transmitting end immediately executes invalidation of the frame counter at the transmitting end and the "frame count value inquiring step". Through this process, the time required until recovery can be shortened.

As another method, in the case where the counter values being held at the receiving end are invalid, the receiving end sets the counter values to be held at the receiving end in such a way that values ranging from the frame count value of the first received frame to a value obtained by adding m to this value are valid, and thereafter performs processing while regarding the counter values being held as valid. Through this process, frame data that becomes invalid immediately after is eliminated, and a frame counter inquiring step occurs at the transmitting end while a certain count value is accepted, thereby enabling recovery in a short time.

Figure 11:
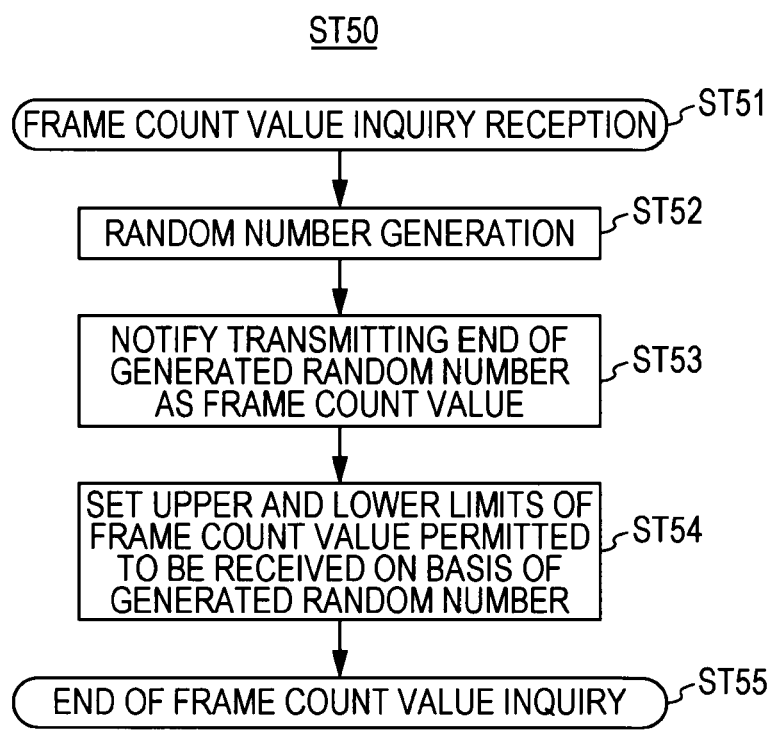
FIG. 11 is a flowchart showing the flow of processing at the receiving end according to the first embodiment of this invention.

Processing in the receiving module will be described with reference to the flowcharts in FIG. 11 and FIG. 12. This processing is performed by the components (hardware and/or software) shown in FIG. 9. FIG. 11 shows details of processing (the process ST50 in FIG. 10) performed with respect to an inquiry for a frame count value from the transmitting module.

In step ST51, the count value inquiry reception section 501 receives a frame count value inquiry. In step ST52, a random number generation instruction is supplied to the random number generation section 502, and a random number is generated. The random number serves as the initial value n of the frame count value.

In step ST53, the transmitting end is notified of the generated random number (the initial value n of the frame count value) by the count value notification section 503. In step ST54, the initial value n of the count value is set in the counter lower limit value holding section 505, and a counter upper limit value (n+m−1) is set in the counter upper limit value holding section 504. Through the above processes, the processing performed with respect to a frame count value inquiry ends (step ST55).

Figure 12:
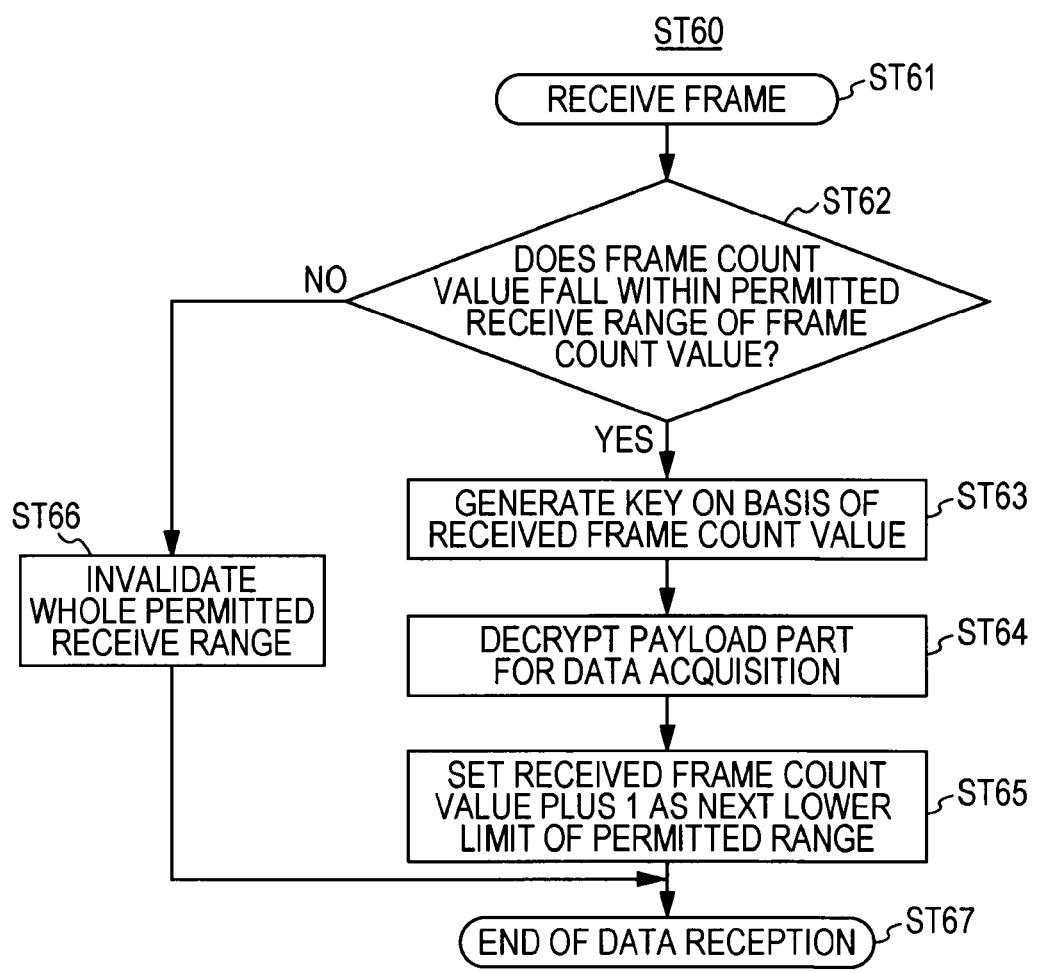
FIG. 12 is a flowchart showing the flow of processing at the receiving end according to the first embodiment of this invention.

FIG. 12 shows details of a receive process (the process ST60 in FIG. 10) in the case when an RF remote control signal is received from the transmitting module. In step ST61, the frame reception section 507 receives an RF remote control signal.

In step ST62, it is determined by the frame count value comparison section 506 whether or not the received frame count value y falls within an acceptable range. In the case where the relationship $(n+x) \leq y \leq (n+m-1)$ is satisfied, the received frame count value y is determined to fall within an acceptable range. Otherwise, the received frame count value y is determined to be an unacceptable value.

If it is determined in step ST62 that the received frame count value does not fall within an acceptable range, the data of the frame is discarded, and in step ST66, the acceptable range (the lower limit value and the upper limit value being held) is invalidated. Then, the data receiving process ends.

If it is determined in step ST62 that the received frame count value falls within an acceptable range, in step ST63, a decryption key is generated by the decryption key generation section 508 on the basis of the received frame count value. In step ST64, payload data is decrypted by the data decryption section 509. In step ST65, a value obtained by adding 1 to the received frame count value is set in the counter lower limit value holding section 505 as the next lower limit value of the acceptable range. Through the above processes, the data receiving process ends (step ST67).

3. Modifications

This invention is not limited to the above-described embodiments, but various modifications based on the technical idea of this invention are possible. For example, a random number is generated after the "frame count value inquiry receiving step ST51 (FIG. 11)" at the receiving end. However, by generating a random number in preparation for the next inquiry after step ST55 in which processing with respect to a frame count value inquiry ends, and holding the generated random number, it is possible to make the response faster.

Further, while the above description is directed to the case where the frame count value changes so as to increase, the frame count value may change so as to decrease. In that case, the lower limit value is fixed, and the upper limit value is decremented with every transmission. This invention can be also applied to the case of enabling communication from electronic equipment to a remote controller, for example.

REFERENCE SIGNS LIST 100 remote controller
101 transmitting module
103 transmit control section
104 key matrix
200 television receiver
201 receiving module
203 receive control section
402 data encryption section
403 frame generation section
405 frame count value holding check section
406 frame count value inquiry/acquisition section
407 increment count holding section 408 frame counter control section
501 count value inquiry reception section
502 random number generation section
503 count value notification section
504 counter upper limit value holding section
505 counter lower limit value holding section
506 frame count value comparison section

The invention claimed is:

1. A data transmitting method comprising:
an inquiring step of making an inquiry to a receiving apparatus when a count value is invalid, receiving a first random number generated in the receiving apparatus, and storing a count value n that is first generated from the first random number into a volatile memory;
an encrypting step of encrypting data to be transmitted by the count value n;
a transmitting step of transmitting data in a frame format including the count value n and the encrypted data; and
a count value changing step of changing the count value stored in the volatile memory, every time data is transmitted,
wherein when the changed value exceeds a set range, an inquiry is made to the receiving apparatus, a second random number different from the first random number generated in the receiving apparatus is received, and a count value n' ($\neq$n) that is first generated from the second random number is stored into the volatile memory, and
the encrypting step, the transmitting step, and the count value changing step are repeated by using the count value n'.

2. The data transmitting method according to claim 1, wherein the receiving apparatus is equipped to electronic equipment, and data for performing remote control of the electronic equipment is transmitted.

3. The data transmitting method according to claim 1, wherein the set range is fixed.

4. The data transmitting method according to claim 1, wherein the set range is transmitted from the receiving apparatus.

5. The data transmitting method according to claim 1, wherein the set range is a range from the count value n to n+m−1, m being a fixed value.

6. A data transmitting apparatus comprising:
inquiring means for making an inquiry to a receiving apparatus when a count value is invalid, receiving a first random number generated in the receiving apparatus, and storing a count value n that is first generated from the first random number into a volatile memory;
encrypting means for encrypting data to be transmitted by the count value n;
transmitting means for transmitting data in a frame format including the count value n and the encrypted data; and
count value changing means for changing the count value stored in the volatile memory, every time data is transmitted,
wherein when the changed value exceeds a set range, an inquiry is made to the receiving apparatus, a second random number different from the first random number generated in the receiving apparatus is received, and a count value n' ($\neq$n) that is first generated from the second random number is stored into the volatile memory, and
an encrypting process by the encrypting means, a transmitting process by the transmitting means, and a count value changing process by the count value changing means are repeated by using the count value n'.

7. The data transmitting apparatus according to claim 6, wherein the receiving apparatus is equipped to electronic equipment, and data for performing remote control of the electronic equipment is transmitted.

8. The data transmitting apparatus according to claim 6, wherein the set range is fixed.

9. The data transmitting apparatus according to claim 6, wherein the set range is transmitted from the receiving apparatus.

10. The data transmitting apparatus according to claim 6, wherein the data transmitting apparatus operates with a battery power supply.

11. The data transmitting apparatus according to claim 6, wherein the set range is a range from the count value n to n+m−1, m being a fixed value.

12. A data communication method which performs communication via a radio channel capable of two-way communication between a transmitting apparatus and a receiving apparatus, wherein:
a data transmitting method includes
an inquiring step of making an inquiry to the receiving apparatus when a count value is invalid, receiving a first random number generated in the receiving apparatus, and storing a count value n that is first generated from the first random number into a volatile memory,
an encrypting step of encrypting data to be transmitted by the count value n,
a transmitting step of transmitting data in a frame format including the count value n and the encrypted data, and
a count value changing step of changing the count value stored in the volatile memory, every time data is transmitted,
in which when the changed value exceeds a set range, an inquiry is made to the receiving apparatus, a second random number different from the first random number generated in the receiving apparatus is received, and a count value n' ($\neq$n) that is first generated from the second random number is stored into the volatile memory, and
the encrypting step, the transmitting step, and the count value changing step are repeated by using the count value n'; and
a data receiving method includes
an inquiry response step of receiving the inquiry, and transmitting the first random number to the receiving apparatus,
a receiving step of receiving the data in the frame format transmitted in the transmitting step,
a determining step of determining whether or not the count value received has increased or decreased from a value being held, and falls within the set range,
a decrypting step of
generating a decryption key by using the received count value when it is determined in the determining step that the received count value matches the count value being held, and decrypting encrypted data within a received frame with the generated decryption key, and
discarding the received frame when it is determined that the received count value does not match the count value being held, and
a count value changing step of changing the value being held, when the encrypted data within the frame is decrypted.

13. A data communication apparatus which performs communication via a radio channel capable of two-way communication between a transmitting apparatus and a receiving apparatus, wherein:
a data transmitting apparatus includes inquiring means for making an inquiry to the receiving apparatus when a count value is invalid, receiving a first random number generated in the receiving apparatus, and storing a count value n that is first generated from the first random number into a volatile memory;

encrypting means for encrypting data to be transmitted by the count value n;

transmitting means for transmitting data in a frame format including the count value n and the encrypted data; and count value changing means for changing the count value stored in the volatile memory, every time data is transmitted, in which when the changed value exceeds a set range, an inquiry is made to the receiving apparatus, a second random number different from the first random number generated in the receiving apparatus is received, and a count value n' ($\neq$n) that is first generated from the second random number is stored into the volatile memory, and an encrypting process by the encrypting means, a transmitting process by the transmitting means, and a count value changing process by the count value changing means are repeated by using the count value n'; and a data receiving apparatus includes inquiry response means for receiving the inquiry, and transmitting the first random number to the receiving apparatus, receiving means for receiving the data in the frame format transmitted by the transmitting means, determining means for determining whether or not the count value received has increased or decreased from a value being held, and falls within the set range, decrypting means for generating a decryption key by using the received count value when it is determined by the determining means that the received count value matches the count value being held, and decrypting encrypted data within a received frame with the generated decryption key, and discarding the received frame when it is determined that the received count value does not match the count value being held, and count value changing means for changing the value being held, when the encrypted data within the frame is decrypted.

* * * * *